May 31, 1955 J. P. MORRIS Re. 24,014

PACKING KEEPER

Original Filed July 19, 1950

INVENTOR

JOHN PAUL MORRIS

BY

Strauch, Nolan & Diggins

ATTORNEYS

United States Patent Office

Re. 24,014
Reissued May 31, 1955

24,014

PACKING KEEPER

John Paul Morris, Western Springs, Ill., assignor to Modern Railway Devices, Inc., Chicago, Ill., a corporation of Illinois Original No. 2,631,903, dated March 17, 1953, Serial No. 174,700, July 19, 1950. Application for reissue March 10, 1955, Serial No. 493,588

10 Claims. (Cl. 308—89)

Matter enclosed in heavy brackets [ ] appears in the original patent but forms no part of this reissue specification; matter printed in italics indicates the additions made by reissue.

The present invention relates to packing keepers for preventing the shifting or rolling of waste in waste packed railway journal boxes and more particularly to wire packing keepers of the type illustrated in my Patent No. 2,503,122.

The packing keeper shown in my Patent No. 2,503,122 is a very efficient and satisfactory keeper, but experience has shown that difficulty is sometimes encountered in inserting this keeper because the upper ends of the rear legs may enter the dust guard opening at the back of the journal box during insertion so that the keeper becomes jammed and cannot be removed without distortion. It has also been found that the journal fillet sometimes rubs against the rear legs causing wear on both the fillet and the rear legs of the keeper.

I have found that both of these difficulties can be overcome, and one of the objects of the present invention is to provide a simple and efficient packing keeper which is easy to insert and which is clear of engagement with the journal fillet.

Another object is to provide a simple and efficient wire packing keeper which will maintain its position in a railway journal box during use without interference with the journal.

These and other objects and advantages reside in novel features of construction, arrangement, and combination of parts, as will hereinafter be more fully set forth and pointed out in the appended claims.

Referring to the drawing.

Figure 1:
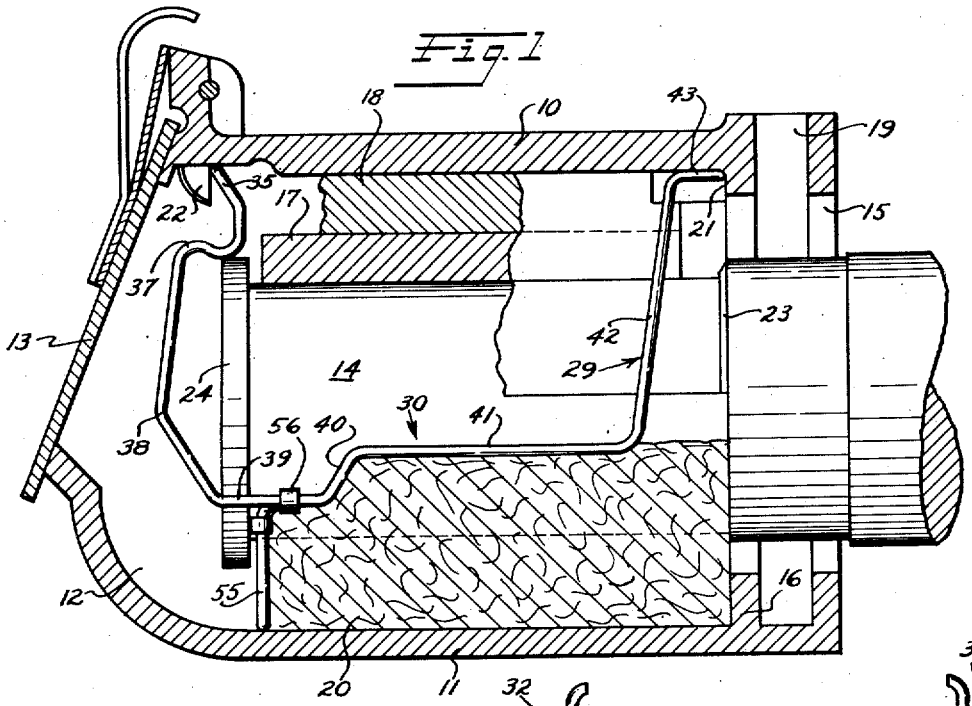
Figure 1 is a vertical section of a journal box showing my improved keeper in position.
Figure 2:
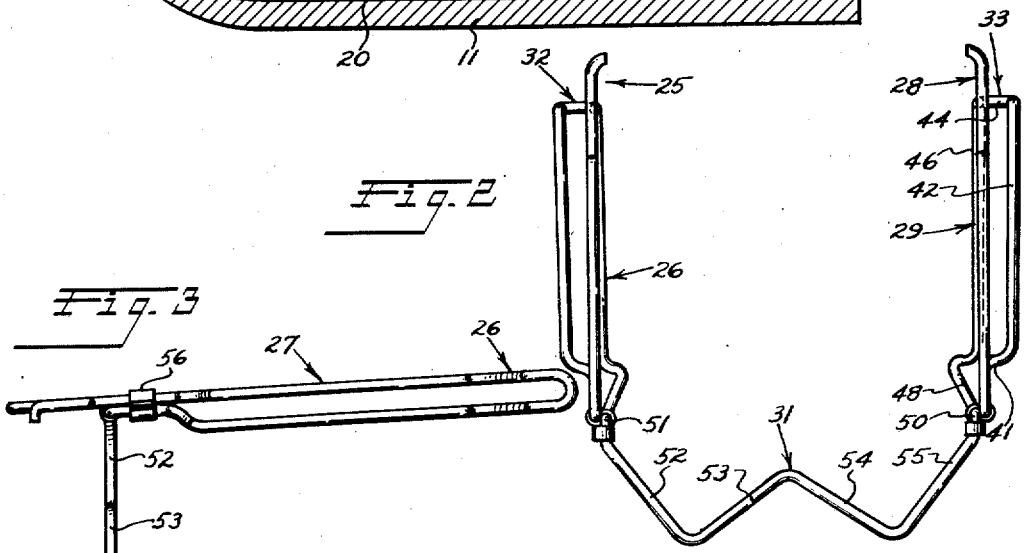
Figure 2 is a front elevation of my keeper.

Figure 1 of the drawing shows a conventional railway journal box according to the standards and specifications of the American Association of Railroads. This journal box has a top 10, a bottom 11, side walls 12, and a hinged cover 13. The journal 14 extends into the box through an opening 15 in the rear wall 16 of the box, and the journal brass 17 rests on the journal 14. The wedge 18 is located between the brass and the top 10 of the box. The rear wall 16 of the box is provided with a slot or groove 19 for receiving an oil seal or dust guard, not shown. Waste packing 20 located in the bottom of the box engages the lower part of the journal 14 and oil in the bottom of the box is carried up to the journal 14 through the waste by capillary action to lubricate the journal 14. Adjacent the top 10 of the box and above the opening 15, the rear wall 16 forms an inwardly facing shoulder 21 which extends downward from the top 10 at the rear of the box, and wedge stop lugs 22 project down from the top of the box 10 at the front near the upper end of the cover 13. The standard journal has a fillet 23 which is usually located within the box closely adjacent the inner surface of the rear wall 16, and the outer end of the journal is provided with a collar 24. The dimensions and construction of this journal assembly and associated parts conform to the standards set by the American Association of Railroads.

It is the purpose of the keeper of the present invention to hold the packing 20 in position without interference with the journal 14, journal brass 17, or wedge 18 which shift or move during operation.

The keeper illustrated in the drawing is formed of a single piece of resilient wire which may be of steel, brass, or other resilient metal, and may be round, square, flat, or other shape. This keeper consists generally of a front leg 25, rear leg 26, and horizontal packing coverage portion 27 on one side of the journal 14, a front leg 28, rear leg 29 and packing coverage portion 30 on the other side of the journal 14, and a cross-piece or brace 31 which extends under the journal 14, and is preferably out of alignment with the journal collar 24. The front legs 25 and 28 extend upward and engage the lugs 22 and the roof 10 and may also engage the side walls 12 of the box. The rear legs 26 and 29 extend upward and are provided at their upper ends with rearwardly extending substantially horizontal portions 32 and 33 respectively. These horizontal portions bring the rear legs 26 and 29 forward in the box so as to leave ample clearance for the fillet 23. The length of the horizontal portion 33 required for safe clearance is not large and I have found that a length of the order of ¾ inch is satisfactory. The horizontal portions 32 and 33 engage the shoulder 20 and preferably engage the side walls 12 of the box and may also engage the top 10. The cross-piece 31 extends downward and engages the bottom 11 of the box. The entire keeper is thus held firmly in position within the box independently of the packing 19 so that it prevents movement of the packing without pressing or compressing the packing.

The keeper shown in the drawing may be formed of a single length of wire bent as hereafter described. The two sides of the keeper, legs 25 and 26 and coverage portion 27 and legs 28 and 29 and coverage portion 30 are substantially identical so that only one side need be described in detail.

The upper portion 35 of the leg 28 is curved toward the front of the box and the extreme end of the wire forming the leg is bent inward at 36. This bent end 36 engages the inner face of the wedge stop lug 22 and the top 10. From the curved portion 35 the wire is bent at 37 and extends downwardly and forwardly to a bend 38 and downwardly and rearwardly to a straight horizontal portion 39. The leg 28 is of such length that when the bent end 36 is in engagement with the roof 10 of the box, the horizontal portion 39 will be substantially below the axis of the journal flange 24 where there is greater clearance between the flange and the side walls 12. The purpose of the various bends in the leg 28 is to permit flexing of the leg 28 vertically and forwardly and rearwardly of the box.

The horizontal wire portion 39 extends rearwardly beyond the flange 32 and is bent upwardly at 40 to the proper height for the packing 19, usually about one inch below the center of the journal 14, and continues in a substantially horizontal plane toward the rear of the box as indicated at 41. Adjacent the rear of the box, the horizontal portion 41 is bent upward as indicated at 42 to form the rear leg 29.

Adjacent the top 10 of the box, the wire is bent to form a rearwardly extending horizontal portion 43 which has at its rear end a sharp, inward hairpin bend 44 for engaging the shoulder 21 formed by the rear wall 16. From the hairpin bend 44, the wire has a horizontal portion 45, a downwardly inclined portion 46 and a horizontal portion 47 substantially parallel to the portions 43, 42 and 41 respectively. Adjacent the flange 24, the portion 47 is bent downwardly and forwardly at 48 and then forwardly at 49. The portion 49 is parallel to and in engagement with the horizontal portion 39.

Just back of the journal flange 14, the portion 49 is bent downward at 50 and is connected to a corresponding vertical portion 51 of the other side of the keeper composed of legs 25 and 26 and coverage portion 27, by the W-shaped cross-piece or brace 31 composed of wire portions 52, 53, 54, and 55. In order to prevent relative movement between the horizontal portions 39 and 49, I prefer to connect the portions 39, 49 and 50 by a clip 56 such as that disclosed in my copending application Serial No. 151,393 filed March 23, 1950, entitled "Packing Keepers."

Figure 3:
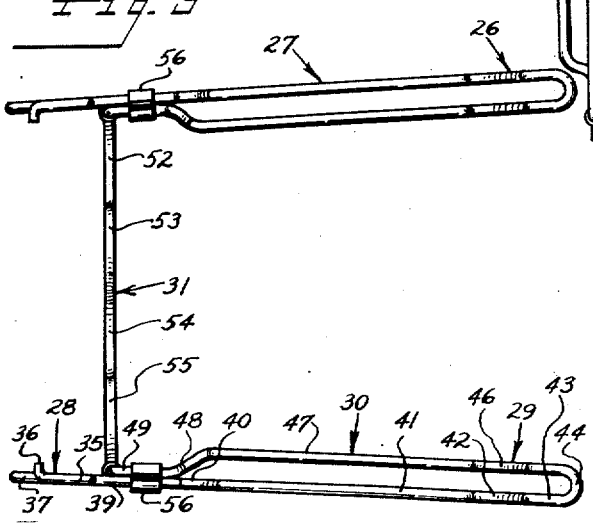
Figure 3 is a top plan view of my keeper.

Figure 3 shows my keeper before insertion in the box. The two sides of the keeper diverge from the front to the rear so that the outer wire portions 41, 42 and 43 will resiliently and snugly engage the side walls of the box. This resilient engagement with the side walls 12 further helps to maintain the keeper in fixed position in the box.

In inserting my keeper in the box, the keeper is normally held with the front end raised and the rear end is slid over the top of the waste 20. When the rear end of the keeper reaches the rear of the box, the front end of the keeper is pushed down to engage the upper ends of legs 25 and 28 behind the lugs 22. This rocks the keeper and forces the upper ends of the legs 26 and 29 upward toward the top of the box. When the keeper is properly inserted the outside of the rear legs 26 and 29 resiliently engage the side walls 12 of the box and the rear ends of the rear legs slide upward against the inside of the rear wall 16 on opposite sides of the opening 15.

Sometimes, however, the keeper is inserted at an angle so that the upper end of one of the rear legs enters the opening 15 in the rear wall 16. When the rear legs are of the form shown in my Patent No. 2,503,122, the upper end of a rear leg may enter the dust guard space 19 and, due to the leverage and direction of motion, may enter this space with substantial force. In some instances the upper end of a rear leg has become jammed in this space to such an extent that it has been difficult to remove the keeper without distorting it.

The short horizontal portion 33 on the upper ends of the rear legs of the keeper of the present invention prevents the entry of the upper ends of the rear legs into the dust guard space 19. If the present keeper should be inserted improperly so that the horizontal portion 33 of a rear leg enters the opening 15, the horizontal portion 33 will engage the upper edge of the opening 15 and stop further movement of the keeper since the horizontal portion 33 is too large to enter the dust guard space 19. Jamming is thereby avoided and the present keeper may be readily withdrawn for proper reinsertion.

From the foregoing it will be apparent that I am able to attain the objects of my invention and provide a packing keeper which is easy to insert and which maintains the waste packing in position without interference with any of the moving parts of the journal and journal box assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A packing keeper for waste packed railway journal boxes, comprising a resilient member having four upwardly extending legs, each leg including a free upper end for engaging the roof of the journal box at the four corners of the roof on the inside, rearwardly projecting means on each rear leg for engaging the rear of the box to hold said rear legs in spaced relation to the rear of the box, a pair of horizontally extending packing engaging portions carried by said legs for overlying the packing on both sides of the journal, the length of the legs being such that the said horizontal portions will be located above the packing when the legs engage said roof to prevent the packing from moving upward on either side of the journal, and a cross piece connecting said portions and holding said portions in spaced relation sufficient to clear a journal in said box.

2. A packing keeper for waste packed railway journal boxes, comprising a resilient member having four upwardly extending legs, each leg including a free upper end for engaging the roof of the journal box at the four corners of the roof on the inside, the upper end of each rear leg having a rearwardly extending portion for engaging the rear of the box to position said rear legs in spaced relation to the rear of said box, a pair of horizontally extending packing engaging portions carried by said legs for overlying the packing on both sides of the journal, the length of the legs being such that the said horizontal portions will be located above the packing when the legs engage said roof to prevent the packing from moving upward on either side of the journal, and a cross piece connecting said portions and holding said portions in spaced relation sufficient to clear a journal in said box.

3. A packing keeper for railway journal boxes, said keeper being formed of resilient wire, and having a pair of connected horizontal packing coverage portions, each of which carries a front and a rear upwardly extending leg, each having a free upper end, the front legs being spaced for engagement with the side walls of the journal box, each rear leg having a projection for engaging the rear wall of said box for holding the upwardly extending portion of such leg in spaced relation to said wall, said legs being of sufficient length for the free upper ends of said legs to engage the roof of a journal box, at the front and rear thereof when the horizontal portions are located to engage the packing on both sides of the journal.

4. A packing keeper for railway journal boxes, said keeper being formed of resilient wire, and having a pair of connected horizontal packing coverage portions, each of which carries a front and a rear upwardly extending leg, each having a free upper end, the front legs being spaced for engagement with the side walls of the journal box, the upper end of each rear leg having a rearwardly extending projection thereon, said legs being of sufficient length for the free upper ends of said legs to engage the roof of a journal box, at the front and rear thereof when the horizontal portions are located to engage the packing on both sides of the journal.

5. A resilient packing keeper for waste packed railway journal boxes having downwardly projecting shoulders at the front and rear of the roof, said keeper comprising a pair of interconnected spaced members adapted to overlie the waste on both sides of the journal, a leg extending upward from each end of each member having a free end for engaging the roof of the journal box, the upper end of each rear leg having a rearwardly extending portion for engaging the rear shoulder of said box, the front legs and the rear legs being spaced apart throughout their lengths by an amount greater than the diameter of the journal, the distance between the legs on each member being greater than the distance between said shoulders whereby said legs are to resiliently engage the shoulders and hold said members in position.

6. A resilient packing keeper for waste packed railway journal boxes having downwardly projecting shoulders at the front and rear of the roof, said keeper comprising a pair of interconnected spaced members adapted to overlie the waste on both sides of the journal, a leg extending upward from each end of each member having a free end for engaging the roof of the journal box, the front legs and the rear legs being spaced apart throughout their lengths by an amount greater than the diameter of the journal, the distance between the legs on each member being greater than the distance between said shoulders whereby said legs are to resiliently engage the shoulders and hold said members in position and means on each rear leg for engaging the rear of said box to hold the upwardly extending portion of such leg in spaced relation to the rear of said box.

*7. A packing keeper for waste packed railway journal boxes, comprising a resilient member having four upwardly extending legs, each rear leg including a free upper end for engaging the roof of the journal box at the corners of the roof on the inside, rearwardly projecting means on each rear leg for engaging the rear of the box to hold said rear legs in spaced relation to the rear of the box, a pair of horizontally extending packing engaging portions carried by said legs for overlying the packing on both sides of the journal, the length of the legs being such that the said horizontal portions will be located above the packing when the legs engage said roof to prevent the packing from moving upward on either side of the journal, and a cross piece connecting said portions and holding said portions in spaced relation sufficient to clear a journal in said box.*

*8. A packing keeper for waste packed railway journal boxes, comprising a resilient member having four upwardly extending legs, each rear leg including a free upper end for engaging the roof of the journal box at the corners of the roof on the inside, the upper end of each rear leg having a rearwardly extending portion for engaging the rear of the box to position said rear legs in spaced relation to the rear of said box, a pair of horizontally extending packing engaging portions carried by said legs for overlying the packing on both sides of the journal, the length of the legs being such that the said horizontal portions will be located above the packing when the legs engage said roof to prevent the packing from moving upward on either side of the journal, and a cross piece connecting said packing engaging portions and holding said portions in spaced relation sufficient to clear a journal in said box.*

*9. A packing keeper for railway journal boxes, said keeper being formed of resilient wire, and having a pair of horizontal packing coverage portions, each of which carries a front and a rear upwardly extending leg, each rear leg having a free upper end and a projection for engaging the rear wall of said box for holding the upwardly extending portion of such leg in spaced relation to said wall, said rear legs being of sufficient length for the free upper ends thereof to engage the roof of the journal box at the rear thereof when the horizontal portions are located to engage the packing on both sides of the journal.*

*10. A packing keeper for railway journal boxes, said packing keeper being formed of resilient material, comprising a pair of horizontal packing coverage portions, an upwardly extending rear leg formed on each of said portions adjacent one end thereof, a rearwardly extending projection formed on each of said rear legs at the upper end thereof, said rear legs being of sufficient length to engage the roof of an associated journal box at the rear thereof when said portions are located to engage the packing on both sides of a journal in an associated box, means adjacent the other end of said portions connecting said portions to hold said portions in spaced relation sufficient to clear the journal, and means adjacent said connecting means on the front ends of said portions to engage an associated journal box at the front thereof.*

References Cited in the file of this patent or the original patent

UNITED STATES PATENTS

| | | |
|---|---|---|
| 2,432,243 | Lewis | Dec. 9, 1947 |
| 2,503,122 | Morris | Apr. 4, 1950 |